(12) United States Patent
Hughes

(10) Patent No.: US 12,243,339 B2
(45) Date of Patent: Mar. 4, 2025

(54) EXTRACTING DEFINED OBJECTS FROM IMAGES OF DOCUMENTS

(71) Applicant: SAP SE, Walldorf (DE)

(72) Inventor: Lance Hughes, Snoqualmie, WA (US)

(73) Assignee: SAP SE, Walldorf (DE)

( * ) Notice: Subject to any disclaimer, the term of this patent is extended or adjusted under 35 U.S.C. 154(b) by 567 days.

(21) Appl. No.: 17/511,456

(22) Filed: Oct. 26, 2021

(65) Prior Publication Data
US 2023/0130940 A1    Apr. 27, 2023

(51) Int. Cl.
*G06V 30/414*    (2022.01)
*G06F 18/21*    (2023.01)
*G06F 18/2431*    (2023.01)
*G06V 30/19*    (2022.01)

(52) U.S. Cl.
CPC ............ *G06V 30/414* (2022.01); *G06F 18/21* (2023.01); *G06F 18/2431* (2023.01); *G06V 30/1908* (2022.01)

(58) Field of Classification Search
CPC ... G06V 30/18–1988; G06V 30/40–43; G06V 30/414; G06V 30/1908; G06F 18/21; G06F 18/2431; G06F 18/1908
See application file for complete search history.

(56) References Cited

U.S. PATENT DOCUMENTS

| | | | |
|---|---|---|---|
| 2021/0012102 A1* | 1/2021 | Cristescu | G06F 40/284 |
| 2021/0042516 A1* | 2/2021 | Panakkal | G06V 30/413 |
| 2021/0192201 A1* | 6/2021 | Nguyen | G06V 30/19173 |

* cited by examiner

*Primary Examiner* — Casey L Kretzer
(74) *Attorney, Agent, or Firm* — Fountainhead Law Group, PC

(57) ABSTRACT

Some embodiments provide a non-transitory machine-readable medium that stores a program. The program receives an image of a document. The program further detects a plurality of text based on the image of the document. The program also uses a machine learning model to predict whether each text in the plurality of text is one of a plurality of defined types of text. Based on the predicted types of text for the plurality of text, the program further determines a set of defined objects.

17 Claims, 15 Drawing Sheets

ACME Hotel
123 Main St., San Francisco, CA

Room: 231

| Date | Description | Amount |
|---|---|---|
| 1/1/2021 | Dinner | 34.52 |
| 1/1/2021 | Room | 112.13 |
| 1/2/2021 | Coffee | 5.98 |
| 1/2/2021 | Lunch | 13.67 |
| 1/2/2021 | Dinner | 57.35 |
| 1/2/2021 | Room | 112.13 |
| 1/3/2021 | Breakfast | 16.42 |
| 1/3/2021 | Cash | (352.20) |

ACME Hotel
123 Main St. San Francisco, CA

Room: 231

| Date | Description | Amount |
|---|---|---|
| 1/1/2021 | Dinner | 34.52 |
| 1/1/2021 | Room | 112.13 |
| 1/2/2021 | Coffee | 5.98 |
| 1/2/2021 | Lunch | 13.67 |
| 1/2/2021 | Dinner | 57.35 |
| 1/2/2021 | Room | 112.13 |
| 1/3/2021 | Breakfast | 16.42 |
| 1/3/2021 | Cash | (352.20) |

FIG. 2B

ACME Hotel
123 Main St., San Francisco, CA

Room: 231

| Date | Description | Amount |
|---|---|---|
| 1/1/2021 | Dinner | 34.52 |
| 1/1/2021 | Room | 112.13 |
| 1/2/2021 | Coffee | 5.98 |
| 1/2/2021 | Lunch | 13.67 |
| 1/2/2021 | Dinner | 57.35 |
| 1/2/2021 | Room | 112.13 |
| 1/3/2021 | Breakfast | 16.42 |
| 1/3/2021 | Cash | (352.20) |

FIG. 2C

ACME Hotel
123 Main St., San Francisco, CA

Room: 231

| Date | Description | Amount |
|---|---|---|
| 1/1/2021 | Dinner | 34.52 |
| 1/1/2021 | Room | 112.13 |
| 1/2/2021 | Coffee | 5.98 |
| 1/2/2021 | Lunch | 13.67 |
| 1/2/2021 | Dinner | 57.35 |
| 1/2/2021 | Room | 112.13 |
| 1/3/2021 | Breakfast | 16.42 |
| 1/3/2021 | Cash | (352.20) |

FIG. 2D

Line Item Objects

| Date | Description | Amount |
|---|---|---|
| 1/1/2021 | Dinner | 34.52 |
| 1/1/2021 | Room | 112.13 |
| 1/2/2021 | Coffee | 5.98 |
| 1/2/2021 | Lunch | 13.67 |
| 1/2/2021 | Dinner | 57.35 |
| 1/2/2021 | Room | 112.13 |
| 1/3/2021 | Breakfast | 16.42 |

300

ACME Hotel
123 Main St., San Francisco, CA

Room: 231

| Date | Description | Amount |
|---|---|---|
| 1/1/2021 | Dinner | 34.52 |
| 1/1/2021 | Room – King Bed | 112.13 |
| 1/2/2021 | Coffee | 5.98 |
| 1/2/2021 | Lunch | 13.67 |
| 1/2/2021 | Dinner | 57.35 |
| 1/2/2021 | Room – King Bed | 112.13 |
| 1/3/2021 | Breakfast | 16.42 |
| 1/3/2021 | Cash | (352.20) |

Room: 231

ACME Hotel
123 Main St, San Francisco, CA

| Date | Description | Amount |
|---|---|---|
| 1/1/2021 | Dinner | 34.52 |
| 1/1/2021 | Room – King Bed | 112.13 |
| 1/2/2021 | Coffee | 5.98 |
| 1/2/2021 | Lunch | 13.67 |
| 1/2/2021 | Dinner | 57.35 |
| 1/2/2021 | Room – King Bed | 112.13 |
| 1/3/2021 | Breakfast | 16.42 |
| 1/3/2021 | Cash | (352.20) |

ACME Hotel
123 Main St., San Francisco, CA

Room: 231

| Date | Description | Amount |
|---|---|---|
| 1/1/2021 | Dinner | 34.52 |
| 1/1/2021 | Room – King Bed | 112.13 |
| 1/2/2021 | Coffee | 5.98 |
| 1/2/2021 | Lunch | 13.67 |
| 1/2/2021 | Dinner | 57.35 |
| 1/2/2021 | Room – King Bed | 112.13 |
| 1/3/2021 | Breakfast | 16.42 |
| 1/3/2021 | Cash | (352.20) |

FIG. 4C

ACME Hotel
123 Main St., San Francisco, CA

Room: 231

| Date | Description | Amount |
|---|---|---|
| 425 ⌇ 1/1/2021 | Dinner | 34.52 |
| 430 ⌇ 1/1/2021 | Room – King Bed | 112.13 |
| 435 ⌇ 1/2/2021 | Coffee | 5.98 |
| 440 ⌇ 1/2/2021 | Lunch | 13.67 |
| 445 ⌇ 1/2/2021 | Dinner | 57.35 |
| 450 ⌇ 1/2/2021 | Room – King Bed | 112.13 |
| 455 ⌇ 1/3/2021 | Breakfast | 16.42 |
| 460 ⌇ 1/3/2021 | Cash | (352.20) |

EXTRACTING DEFINED OBJECTS FROM IMAGES OF DOCUMENTS

BACKGROUND

The proliferation of cameras and other electronic image capture devices has led to massive growth in the availability of images. For instance, cameras can be found on almost all mobile devices, and such ready access to a camera allows users to capture an ever increasing number of electronic images. Interestingly, images often contain data, and such data can be useful for a wide range of applications. For example, images of checks can be submitted to banks and processing based on data extracted from the checks (e.g., amount, account number, routing number, etc.). As another example, images of receipts may be submitted to expense management systems. Data extracted from images of receipts can be used to populate expense reports.

SUMMARY

In some embodiments, a non-transitory machine-readable medium stores a program executable by at least one processing unit of a device. The program receives an image of a document. The program further detects a plurality of text based on the image of the document. The program also uses a machine learning model to predict whether each text in the plurality of text is one of a plurality of defined types of text. Based on the predicted types of text for the plurality of text, the program further determines a set of defined objects.

In some embodiments, the program may further determining a bounding box for each text in the plurality of text; determining a particular bounding box that encompasses each text having a defined type of text in the plurality of defined types of text; and ignoring each text in the plurality of text with a bounding box that is outside of the particular bounding box. Determining the set of defined objects may include, upon determining, for each defined type of text in the plurality of defined types of text, that a number of text having the defined type of text is the same, generating the set of defined objects so that each defined object in the set of defined objects includes one of each defined type of text in the plurality of defined types of text.

In some embodiments, determining the set of defined objects may include determining a bounding box for each text in the plurality of text; sorting the plurality of text based on a y-coordinate of the bounding boxes of the plurality of text; and generating the set of defined objects based on the sorted plurality of text. Determining the set of defined objects may include determining, for each defined type of text in the plurality of defined types of text, a bounding box that encompasses each text having the defined type of text; and, for each bounding box, identifying text in the bounding box that is predicted as not being the defined type of text and determining whether the identified text is the defined type of text.

In some embodiments, each defined object in the set of defined objects may include one of each defined type of text in the plurality of defined types of text. The plurality of defined types of text may include a date type of text, a description text, and an amount type of text.

In some embodiments, a method receives an image of a document. The method further detects a plurality of text based on the image of the document. The method also uses a machine learning model to predict whether each text in the plurality of text is one of a plurality of defined types of text. Based on the predicted types of text for the plurality of text, the method further determines a set of defined objects.

In some embodiments, the method may further determining a bounding box for each text in the plurality of text; determining a particular bounding box that encompasses each text having a defined type of text in the plurality of defined types of text; and ignoring each text in the plurality of text with a bounding box that is outside of the particular bounding box. Determining the set of defined objects may include, upon determining, for each defined type of text in the plurality of defined types of text, that a number of text having the defined type of text is the same, generating the set of defined objects so that each defined object in the set of defined objects includes one of each defined type of text in the plurality of defined types of text.

In some embodiments, determining the set of defined objects may include determining a bounding box for each text in the plurality of text; sorting the plurality of text based on a y-coordinate of the bounding boxes of the plurality of text; and generating the set of defined objects based on the sorted plurality of text. Determining the set of defined objects may include determining, for each defined type of text in the plurality of defined types of text, a bounding box that encompasses each text having the defined type of text; and, for each bounding box, identifying text in the bounding box that is predicted as not being the defined type of text and determining whether the identified text is the defined type of text.

In some embodiments, each defined object in the set of defined objects may include one of each defined type of text in the plurality of defined types of text. The plurality of defined types of text may include a date type of text, a description text, and an amount type of text.

In some embodiments, a system includes a set of processing units and a non-transitory machine-readable medium that stores instructions. The instructions cause at least one processing unit to receive an image of a document. The instructions further cause the at least one processing unit to detect a plurality of text based on the image of the document. The instructions also cause the at least one processing unit to use a machine learning model to predict whether each text in the plurality of text is one of a plurality of defined types of text. Based on the predicted types of text for the plurality of text, the instructions further cause the at least one processing unit to determine a set of defined objects.

In some embodiments, the instructions may further cause the at least one processing unit to determine a bounding box for each text in the plurality of text; determine a particular bounding box that encompasses each text having a defined type of text in the plurality of defined types of text; and ignore each text in the plurality of text with a bounding box that is outside of the particular bounding box. Determining the set of defined objects may include, upon determining, for each defined type of text in the plurality of defined types of text, that a number of text having the defined type of text is the same, generating the set of defined objects so that each defined object in the set of defined objects includes one of each defined type of text in the plurality of defined types of text.

In some embodiments, determining the set of defined objects may include determining a bounding box for each text in the plurality of text; sorting the plurality of text based on a y-coordinate of the bounding boxes of the plurality of text; and generating the set of defined objects based on the sorted plurality of text. Determining the set of defined objects may include determining, for each defined type of text in the plurality of defined types of text, a bounding box that encompasses each text having the defined type of text; and, for each bounding box, identifying text in the bounding box that is predicted as not being the defined type of text and determining whether the identified text is the defined type of text. Each defined object in the set of defined objects may include one of each defined type of text in the plurality of defined types of text.

The following detailed description and accompanying drawings provide a better understanding of the nature and advantages of various embodiments of the present disclosure.

BRIEF DESCRIPTION OF THE DRAWINGS

FIGS. 2A-2D illustrate an example processing of an image of a receipt according to some embodiments.

FIGS. 4A-4D illustrate another example processing of an image of a receipt according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for extracting defined objects from images of receipts. In some embodiments, a computing system receives, from a client device, an image of a document (e.g., a receipt) captured by a camera of the client device. Upon receiving the image, the computing system detects instances of words in the image. Next, for each detected word, the computing system uses a trained machine learning model to determine whether the word is one of several defined types of words (e.g., a date, a description, an amount, etc.) and assign a corresponding label to the word based on the determination. Based on labels assigned to the detected words in the image, the computing system then determines a set of line item objects that includes detected text from the image of the receipt. For instance, each line item object can include a date, a description, and an amount. The computing system generates an expense report for a user of the client device and uses the set of line items to populate fields in the expense report.

Figure 1:
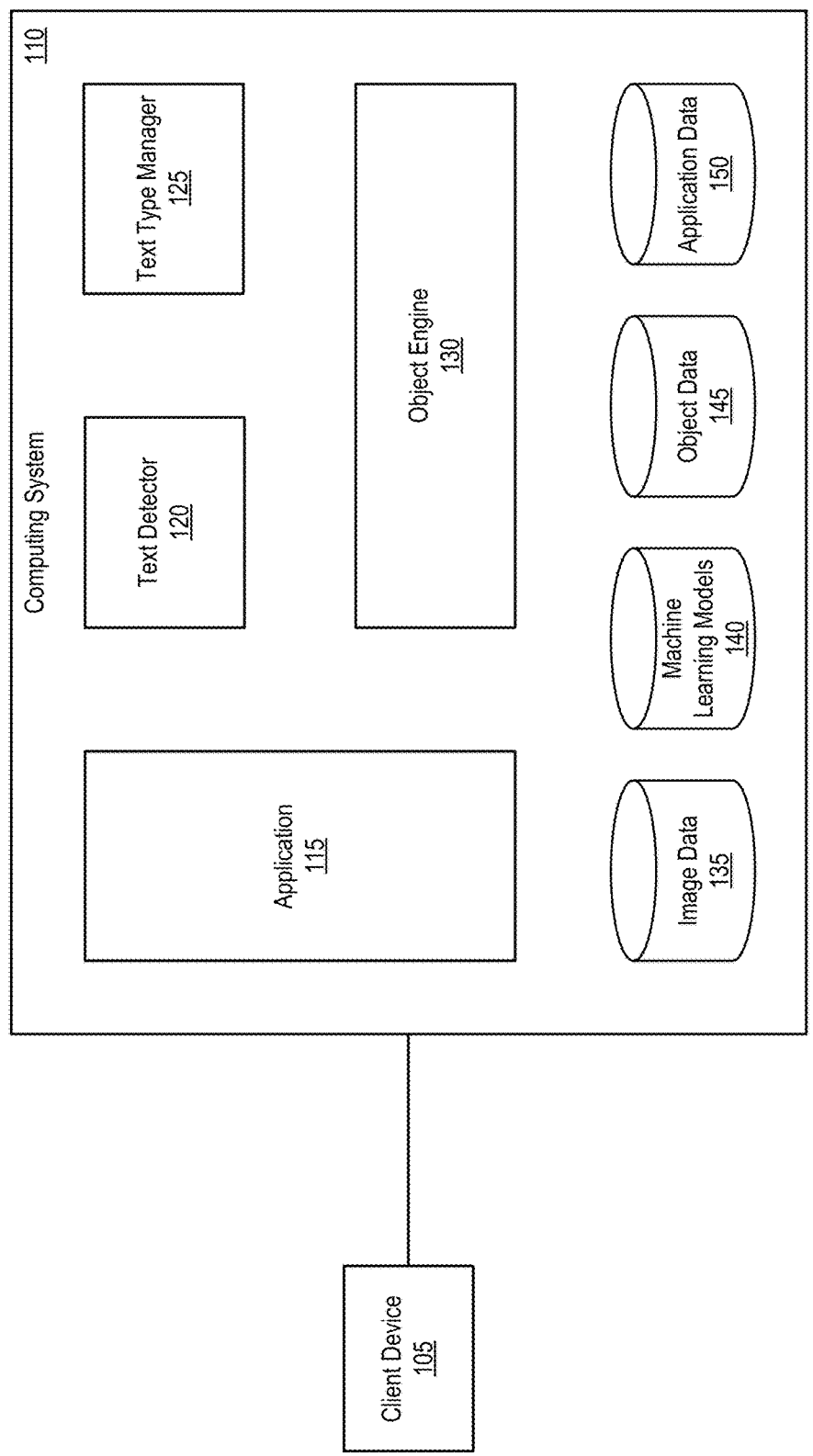
FIG. 1 illustrates a system for extracting defined objects from images of documents according to some embodiments.

FIG. 1 illustrates a system 100 for extracting defined objects from images of documents according to some embodiments. As shown, system 100 includes client device 105 and computing system 110. Client device 105 may communicate and interact with computing system 110. For instance, a user of client device 105 can send an image of a document (e.g., a receipt) to computing system 110 (e.g., via a web browser or an application operating on client device 105) for processing. The image may be captured by an image capture device (e.g., a camera) communicatively coupled to client device 105. In some cases, a user of client device 105 can access application 115 and request to view expense reports generated based on images that client device 105 sent to computing system 110 for processing. While FIG. 1 shows one client device, one of ordinary skill in the art will appreciate that system 100 can include any number of additional client devices that are configured the same as or similar to client device 105.

As illustrated in FIG. 1, computing system 110 includes application 115, text detector 120, text type manager 125, object engine 130, and storages 135-150. Image data storage 135 is configured to store images received from client devices (e.g., client device 105). Machine learning (ML) models storage 140 stores ML models configured to predict defined types of data (e.g., types of text) based on data detected in images. Object data storage 145 is configured to store defined data objects extracted from images of documents (e.g., line item data objects extracted from images of receipts). Application data storage 150 stores application generated and/or utilized by application 115. For instance, application data storage 150 can store expense reports generated by application 115. In some embodiments, storages 135-150 are implemented in a single physical storage while, in other embodiments, storages 135-150 may be implemented across several physical storages. While FIG. 1 shows storages 135-150 as part of computing system 110, one of ordinary skill in the art will appreciate that image data storage 135, ML models storage 140, object data storage 145, and/or application data storage 150 may be external to computing system 110 in some embodiments.

Application 115 is a software application operating on computing system 110 configured to manage images of documents for client device 105. For instance, application 115 can receive from client device 105 an image of a document that was captured by an image capture device of client device 105. In response to receiving the image, application 115 sends the image to text detector 120 along with a request to process it. In some embodiments, application 115 stores also the image of the document in image data storage 135. In some instances, application 115 may receive from client device 105 a request for data extracted from images of documents (e.g., a request for expense reports that include expenses extracted from images of receipts) that client device send application 115 for processing. In response, application 115 accesses application data storage 150 to retrieve the requested data and provides the data to client device 105.

Text detector 120 is responsible for processing images of documents by detecting text in the images. For example, text detector 120 can receive an image of a document from application 115 and a request to process the image. In response to the request, text detector 120 may perform some pre-processing operations on the image. For instance, text detector 120 can perform some tilt correction operations on the image. In some embodiments, text detector 120 performs tilt correction operations on the image of the document by determining an angle that the image is tilted and then adjusting the tilt of the image by the determined angle. In some such embodiments, text detector 120 uses a Hough transform technique to determine the angle that the image is tilted.

After performing pre-processing operations on the image, text detector 120 detects pieces of text (e.g., words) in the image of the document. Text detector 120 can determine, for each piece of detected text, a bounding box that encompasses the piece of text. In some embodiments, text detector 120 employs an optical character recognition (OCR) technique to detect text in the image of the document. In some such embodiments, text detector 120 sends the image of the document to a third-party service that performs OCR on the image to detect text in the image and determines the bounding boxes of detected text. Text detector 120 sends text type manager 125 the image of the document, the text detected in the image of the document, and the bounding boxes of the detected text.

Text type manager 125 is configured to determine types of text for text detected in an image of a document. For instance, text type manager 125 may receive from text detector 120 an image of a document, the text detected in the image of the document, and bounding boxes of the detected text. In response, text type manager 125 accesses ML models storage 140 to retrieve a ML model configured to predict defined types of text based on text detected in images. Text type manager 125 provides the image of the document, the text detected in the image of the document, and the bounding boxes of the detected text as inputs to the ML model. Based on the inputs, the ML model determines, for each piece of detected text, whether the piece of text is one of the defined types of text and assigns a corresponding label to the piece of text. Then, text type manager 125 sends object engine 130 the image of the document, the text detected in the image of the document, the bounding boxes of the detected text, and the assigned labels for the detected text in the image of the document.

Additionally, text type manager 125 handles training of ML models. To train an ML model to perform a particular task, text type manager 125 provides the ML model with training data that is the similar to the data on which the ML model is expected to perform the particular task. For example, to train an ML model to predict whether a piece of text detected in an image of a document is one of several defined types of text, text type manage 125 can train the ML model with images that contain text labeled with the correct defined type of data. Once the ML model is trained, text type manager 125 may feed an image of a document, detected text in the image, etc. to the ML model for the ML model to predict whether each piece of text detected in the image is one of several types of text. Different ML models trained to predict different sets of defined types of data can be trained and later used by text type manager 125.

Object engine 130 handles the determination of defined data objects based on text detected in images of documents. For instance, object engine 130 may receive may receive from text type manager 125 an image of a document, the text detected in the image of the document, the bounding boxes of the detected text, and the assigned labels for the detected text in the image of the document. To determine defined data objects, object engine 130 first determines a bounding box that encompasses all text detected in the image of the document that is determined to be one of the defined types of text. Next, object engine 130 ignores any detected text that are outside the bounding box. Object engine 130 then determines the number of each type of text detected in the image of the document based on the assigned labels. If the image of the document includes the same number of each type of text, then object engine 130 determines a bounding box for each defined type of text that encompasses all the text having the defined type of text. Then, object engine 130 generates defined data objects based on the bounding boxes. Data objects can be defined differently. For example, in some cases, a data object can be defined to include one of each defined type of text. This defined data object will be used to explain how object engine 130 determines data objects. However, one of ordinary skill in the art will understand that object engine 130 may perform additional and/or different operations to determine different defined data objects. Based on the example defined data object, object engine 130 can determine data objects based on the bounding boxes by generating a first data object that includes the highest positioned text in each bounding box that is the corresponding defined type of text, generating a second data object that includes the second highest positioned text in each bounding box that is the corresponding defined type of text, generating a third data object that includes the third highest positioned text in each bounding box that is the corresponding defined type of text, and so on and so forth.

If the image of the document does not include the same number of each type of text, object engine 130 sorts all the text that are each one of the defined types of text based on a y-coordinate of the corresponding bounding boxes (e.g., the y-coordinate of the center of the bounding boxes) that each encompasses a piece of text. Then, object engine 130 groups the text based on the sorted list of text. In some embodiments, object engine 130 groups the text by identifying a first piece of text with the highest bounding box y-coordinate value. Next, object engine 130 identifies a second piece of text with the second highest bounding box y-coordinate value and checks whether the bounding box y-coordinate value of the second piece of text is below the bottom of the bounding box of the first piece of text. If so, object engine 130 creates a group of text that includes any previously processed and ungrouped pieces of text (e.g., the first piece of text in this example). Otherwise, object engine 130 identifies a third piece of text with the third highest bounding box y-coordinate value and checks whether the bounding box y-coordinate value of the third piece of text is below the bottom of the bounding box of the first piece of text. If so, object engine 130 creates a group of text that includes any previously processed and ungrouped pieces of text (e.g., if the first and second pieces of text are not yet grouped, then the group would include the first piece of text and the second piece of text). Object engine 130 processes the remaining pieces of text in this same manner. If the last piece of text (i.e., the one with the lowest bounding box y-coordinate value) is not grouped, object engine 130 creates a group that includes the last piece of text. Next, object engine 130 may combine certain types of text in each group of text. In some embodiments, object engine 130 combines pieces of text having the same certain type of text from left to right and top to bottom based on the corresponding bounding boxes of each piece of text. After combining text, object engine 130 checks each group of text and determines whether the group of text includes one of each defined type of text. If each group of text includes one of each defined type of text, object engine 130 generates, for each group of text, a data object that includes text in the group of text.

If each group of text does not include one of each defined type of text, object engine 130 checks for unlabeled text that should have been labeled (e.g., the ML model determined that a piece of text is not one of the defined types of text when in fact it is). To do so, object engine 130 determines, for each defined type of text, bounding boxes that encompasses all the text having the defined type of text. For each of these bounding boxes, object engine 130 checks if there are any pieces of text within the bounding box that is determined to not be one of the defined types of text. If so, object engine 130 examines the pieces of text and checks whether they are in fact the defined type of text associated with the bounding box. For any piece of text that object engine 130 determines is in fact the defined type of text, object engine 130 labels it with the corresponding defined type of text. Once object engine 130 finishes checking for unlabeled text and object engine 130 determined there are newly labeled pieces of text, object engine 130 repeats the grouping process described above. Then, object engine 130 checks each group of text and determines whether the group of text includes one of each defined type of text. If each group of text includes one of each defined type of text, object engine 130 generates, for each group of text, a data object that includes text in the group of text.

If each group of text still does not include one of each defined type of text or if there were not any newly labeled text, object engine 130 uses the sorted list of all the text that are each one of the defined types of text based on the y-coordinate of the corresponding bounding boxes (e.g., the y-coordinate of the center of the bounding boxes) of the pieces of text. Object engine 130 generates a list of current text, identifies a first piece of text with the highest bounding box y-coordinate value, and adds the first piece of text to the list of current text. Then, object engine 130 identifies a second piece of text with the second highest bounding box y-coordinate value and checks whether the list of current text includes a piece of text that is the same type of text as the type of text of the second piece of text. If so, object engine 130 discards the list of current text, creates a new list of current text, and adds the second piece of text to it. If not, object engine 130 adds the second piece of text to the list of current text and checks if the list of current text includes one of each defined type of text to form a defined data object. If so, object engine 130 generates a data object that includes the text in the list of current text and generates a new list of current text. Object engine 130 repeats this process with the remaining pieces of text in the sorted list of text.

An example operation will now be described by reference to FIGS. 1 and 2A-2D. Specifically, the example operation will demonstrate how an image of a receipt is processed by computing system 110 to extract data objects. The operation starts by a user of client device 105 sending application 115 an image of a receipt. FIG. 2A illustrates an example of an image 200 of a receipt according to some embodiments. In particular, image 200 is the image that the user of client device 105 sends to application 115 in this example. As shown, image 200 is an image of a receipt for a stay at a hotel. The receipt includes a list of line items for dinner on Jan. 1, 2021 for 34.52, a room on Jan. 1, 2021 for 112.13, coffee on Jan. 2, 2021 for 5.98, lunch on Jan. 2, 2021 for 13.65, dinner on Jan. 2, 2021 for 57.35, a room on Jan. 2, 2021 for 112.13, breakfast on Jan. 3, 2021 for 16.42, and a cash payment on Jan. 3, 2021 for 352.20.

Upon receiving image 200, application 115 sends text detector 120 image 200 and a request to process image 200. In response to receiving the request and image 200, text detector 120 performs some pre-processing operations (e.g., the tilt correction operations described above) on image 200. Next, text detector 120 detects words in image 200 of the receipt (e.g., using an OCR technique), determines, for each detected word, a bounding box that encompasses the word.

FIG. 2B illustrates image 200 of the receipt with detected words and associated bounding boxes according to some embodiments. As shown in FIG. 2B, text detector 120 has detected words in image 200. In addition, text detector 120 has determined, for each detected word, a bounding box that encompasses the word (e.g., a set of coordinates specifying the location of the four corners of the bounding box in image 200). Text detector 120 then sends text type manager 125 image 200 of the receipt, the words detected in image 200 of the receipt, and the bounding boxes of the detected words.

When text type manager 125 receives image 200, the words detected in image 200 of the receipt, and the bounding boxes of the detected words, text type manager 125 accesses ML models storage 140 to retrieve a ML model configured to predict date type of words, description type of words, and amount type of words based on words detected in images. Text type manager 125 provides image 200 of the receipt, the words detected in image 200 of the receipt, and the bounding boxes of the detected words as inputs to the ML model. Based on the inputs, the ML model determines, for each detected word, whether the word is a date type of word, a description type of word, or an amount type of word and assigns a corresponding label to the word. For this example, as shown in FIG. 2B, the ML model determines that words 205 in image 200 are date type of words, words 210 in image 200 are description type of words, and words 215 in image 200 are amount type of words. The ML model assigns corresponding labels (e.g., a date label, a description label, and an amount label) for words 205-215. Then, text type manager 125 sends object engine 130 image 200 of the receipt, the words detected in image 200 of the receipt, the bounding boxes of the detected words, and the assigned labels for the detected words in image 200 of the receipt.

Once object engine 130 receives image 200 of the receipt, the words detected in image 200 of the receipt, the bounding boxes of the detected words, and the assigned labels for the detected words in image 200 of the receipt, object engine 300 determines a bounding box that encompasses all words detected in image 200 of the receipt that is determined to be a date type of word, a description type of word, or an amount type of word. FIG. 2C illustrates image 200 of the receipt with bounding box 220 that encompasses all words determined to be a defined type of word according to some embodiments. In this example, object engine 130 determined bounding box 220. As shown, bounding box 220 encompasses all of the words in words 205-215, which are the words that are determined to be one of the defined types of words. Object engine 130 then ignores any detected words that are outside bounding box 220. Next, object engine 130 determines the number of each type of word detected in image 200 of the receipt based on the assigned labels.

If image 200 of the receipt includes the same number of each type of word, object engine 130 determines a bounding box for each defined type of word that encompasses all the words having the defined type of word. Here, object engine 130 determines that image 200 of the receipt includes the same number of date words, description words, and amount words (eight each in this example). Therefore, object engine 130 determines a bounding box for the date type of word that encompasses all the words having the date type of word, a bounding box for the description type of word that encompasses all the words having the description type of word, and a bounding box for the amount type of word that encompasses all the words having the amount type of word. FIG. 2D illustrates image 200 of the receipt with bounding boxes 225-235 for each of the defined types of words according to some embodiments. For this example, object engine 130 determines bounding boxes 225-235. As illustrated, bounding box 225 encompasses all of the words that are date type of words (i.e., words 205), bounding box 230 encompasses all of the words that are description type of words (i.e., words 210), and bounding box 235 encompasses all of the words that are amount type of words (i.e., words 215).

Based on bounding boxes 225-235, object engine 130 generates defined data objects.

Figure 3:
FIG. 3 illustrates data objects extracted from the image of the receipt illustrated in FIGS. 2A-2D according to some embodiments.

The defined data object in this example is one that include one of each defined type of word (i.e., one date type of word, one description type of word, and one amount type of word). For this defined data object, object engine 130 determines data objects based on bounding boxes 225-235 by generating a first data object that includes the highest positioned words in each of the bounding boxes 225-235, generating a second data object that includes the second highest positioned words in each of the bounding boxes 225-235, generating a third data object that includes the third highest positioned words in each of the bounding boxes 225-235, and so on and so forth. After object engine 130 determines data objects using the technique described above, object engine 130 may perform some post-processing operations. For example, in some embodiments, object engine 130 can iterate through each data object and check whether the value of amount of the current data object is within a defined threshold of the sum of the values of the amounts of the previous data objects. If so, object engine 130 removes the current data object. FIG. 3 illustrates data objects 300 extracted from image 200 of the receipt according to some embodiments. As shown, data objects 300 includes the data objects generated by object engine 130 in the manner described above. Here, object engine 130 also determined that the last generated data object that includes the date of "1/3/2021," a description of "Cash," and an amount of "(352.20)" has an amount value that is within a defined threshold of the sum of the amount values of the first seven data objects. As such, object engine 130 removed the last generated data object from data objects 300, as depicted in FIG. 3.

Another example operation will now be described by reference to FIGS. 1 and 4A-4D. In particular, this example operation will demonstrate how a different image of a receipt is processed by computing system 110 to extract data objects. The operation begins by a user of client device 105 sending application 115 an image of a receipt. FIG. 4A illustrates an example of an image 400 of a receipt according to some embodiments. Specifically, image 400 is the image that the user of client device 105 sends to application 115 for this example. As illustrated, image 400 is an image of a receipt for a stay at a hotel. The receipt is similar to the receipt shown in FIGS. 2A-2D except the second and sixth line items have different descriptions.

When application 115 receives image 400, application 115 sends text it to detector 120 along with a request to process image 400. In response, text detector 120 performs some pre-processing operations (e.g., the tilt correction operations described above) on image 400. Text detector 120 then detects words in image 400 of the receipt (e.g., using an OCR technique), determines, for each detected word, a bounding box that encompasses the word. FIG. 4B illustrates image 400 of the receipt with detected words and associated bounding boxes according to some embodiments. As depicted in FIG. 4B, text detector 120 has detected words in image 400. Also, text detector 120 has determined, for each detected word, a bounding box that encompasses the word (e.g., a set of coordinates specifying the location of the four corners of the bounding box in image 400). Next, text detector 120 sends text type manager 125 image 400 of the receipt, the words detected in image 400 of the receipt, and the bounding boxes of the detected words.

In response to receiving image 400, the words detected in image 400 of the receipt, and the bounding boxes of the detected words, text type manager 125 accesses ML models storage 140 to retrieve the same ML model used in the example operation above (i.e., the ML model configured to predict date type of words, description type of words, and amount type of words based on words detected in images). Text type manager 125 provides image 400 of the receipt, the words detected in image 400 of the receipt, and the bounding boxes of the detected words as inputs to the ML model. Based on the inputs, the ML model determines, for each detected word, whether the word is a date type of word, a description type of word, or an amount type of word and assigns a corresponding label to the word. As illustrated in FIG. 4B, the ML model determines, in this example, that words 405 in image 400 are date type of words, words 410 in image 400 are description type of words, and words 415 in image 400 are amount type of words. The ML model assigns corresponding labels (e.g., a date label, a description label, and an amount label) for words 405-415. Text type manager 125 then sends object engine 130 image 400 of the receipt, the words detected in image 400 of the receipt, the bounding boxes of the detected words, and the assigned labels for the detected words in image 400 of the receipt.

Upon receiving image 400 of the receipt, the words detected in image 400 of the receipt, the bounding boxes of the detected words, and the assigned labels for the detected words in image 400 of the receipt, object engine 300 determines a bounding box that encompasses all words detected in image 400 of the receipt that is determined to be a date type of word, a description type of word, or an amount type of word. FIG. 4C illustrates image 400 of the receipt with bounding box 420 that encompasses all words determined to be a defined type of word according to some embodiments. Here, object engine 130 determined bounding box 420. As depicted in FIG. 4C, bounding box 420 encompasses all of the words in words 405-415, which are the words that are determined to be one of the defined types of words. Next, object engine 130 ignores any detected words that are outside bounding box 420. Object engine 130 then determines the number of each type of word detected in image 400 of the receipt based on the assigned labels.

If image 400 of the receipt includes the same number of each type of word, object engine 130 determines a bounding box for each defined type of word that encompasses all the words having the defined type of word. For this example, object engine 130 determines that image 400 of the receipt does not include the same number of date words, description words, and amount words (i.e., there are eight date type of words, twelve description type of words, and eight amount type of words). Thus, object engine 130 sorts all the words that are each a date type of word, a description type of word, or an amount type of word based on a y-coordinate of the corresponding bounding boxes (e.g., the y-coordinate of the center of the bounding boxes) that each encompasses a word. That is, object engine 130 sorts words 405-415 based on the bounding boxes encompassing each of the words in words 405-415.

Next, object engine 130 groups the words based on the sorted list of words by identifying a first word with the highest bounding box y-coordinate value. Object engine 130 then identifies a second word with the second highest bounding box y-coordinate value and checks whether the bounding box y-coordinate value of the second word is below the bottom of the bounding box of the first word. If so, object engine 130 creates a group of words that includes any previously processed and ungrouped words. Otherwise, object engine 130 identifies a third word with the third highest bounding box y-coordinate value and checks whether the bounding box y-coordinate value of the third word is below the bottom of the bounding box of the first word. If so, object engine 130 creates a group of words that includes any previously processed and ungrouped words. Object engine 130 processes the remaining words in this same manner. If the last word (i.e., the one with the lowest bounding box y-coordinate value) is not grouped, object engine 130 creates a group that includes the last word. Next, object engine 130 may combine certain types of words in each group of words. In some embodiments, object engine 130 combines words having the same certain type of words from left to right and top to bottom based on the corresponding bounding boxes of each word. After performing the combining operations, object engine 130 checks each group of words and determines whether the group of words includes one of each defined type of word. If each group of words includes one of each defined type of word, object engine 130 generates, for each group of words, a data object that includes words in the group of words.

Figure 5:
FIG. 5 illustrates data objects extracted from the image of the receipt illustrated in FIGS. 4A-4D according to some embodiments.

FIG. 4D illustrates image 400 with generated groups of words 425-460 according to some embodiments. In this example, object engine 130 uses the technique described above to generate groups of words 425-460. As shown in FIG. 4D, object engine 130 combined the description words in each of the group of words 430 and 450 using the method explained above into a single instance of a description type of word. For this reason, object engine 130 determined that each of the group of words 425-460 includes one of each defined type of word (i.e., one date type of word, one description type of word, and one amount type of word). FIG. 5 illustrates data objects 500 extracted from image 400 of the receipt according to some embodiments. As illustrated, data objects 500 includes the data objects generated by object engine 130 in the fashion described above. For this example, object engine 130 also determined that the last generated data object that includes the date of "1/3/2021," a description of "Cash," and an amount of "(352.20)" has an amount value that is within a defined threshold of the sum of the amount values of the first seven data objects. Accordingly, object engine 130 removed the last generated data object from data objects 500, as shown in FIG. 5.

Now if each group of words does not include one of each defined type of word, object engine 130 checks for unlabeled words that should have been labeled (e.g., the ML model determined that a word is not one of the defined types of words when in fact it is). To do so, object engine 130 determines, for each defined type of word, bounding boxes that encompasses all the words having the defined type of word (e.g., bounding boxes similar to bounding boxes 225-235). For each of these bounding boxes, object engine 130 checks if there are any words within the bounding box that is determined to not be one of the defined types of words. If so, object engine 130 examines the words and checks whether they are in fact the defined type of word associated with the bounding box. For any word that object engine 130 determines is in fact the defined type of word, object engine 130 labels it with the corresponding defined type of word. For example, if a bounding box is determined for a date type of word, object engine 130 can check whether words within the bounding box is determined to not be a date type of word by comparing the words to any number of different defined date formats (e.g., MM/DD/YYYY, DD/MM/YYYY, MM DD, YYYY, MM-DD-YY, etc.). For any word that matches a defined date format, object engine 130 labels the word as a date type of word. Object engine 130 can do the same process for description type of words and amount type of words using appropriate rules for determining whether unlabeled words are description type of words or amount type of words. After checking for unlabeled words and object engine 130 determined there are newly labeled words, object engine 130 repeats the grouping process described above. Next, object engine 130 checks each group of words and determines whether the group of words includes one of each defined type of word. If each group of words includes one of each defined type of word, object engine 130 generates, for each group of words, a data object that includes words in the group of words.

If each group of words still does not include one of each defined type of word or if there were not any newly labeled words, object engine 130 uses the sorted list of all the words that are each one of the defined types of word based on the y-coordinate of the corresponding bounding boxes (e.g., the y-coordinate of the center of the bounding boxes) of the words. Then, object engine 130 generates a list of current words, identifies a first word with the highest bounding box y-coordinate value, and adds the first word to the list of current words. Next, object engine 130 identifies a second word with the second highest bounding box y-coordinate value and checks whether the list of current words includes a word that is the same type of word as the type of word of the second word. If so, object engine 130 discards the list of current words, creates a new list of current words, and adds the second word to it. If not, object engine 130 adds the second word to the list of current words and checks if the list of current words includes one of each defined type of word to form a defined data object. If so, object engine 130 generates a data object that includes the words in the list of current words and generates a new list of current words. Object engine 130 repeats this process with the remaining words in the sorted list of words.

Figure 6:
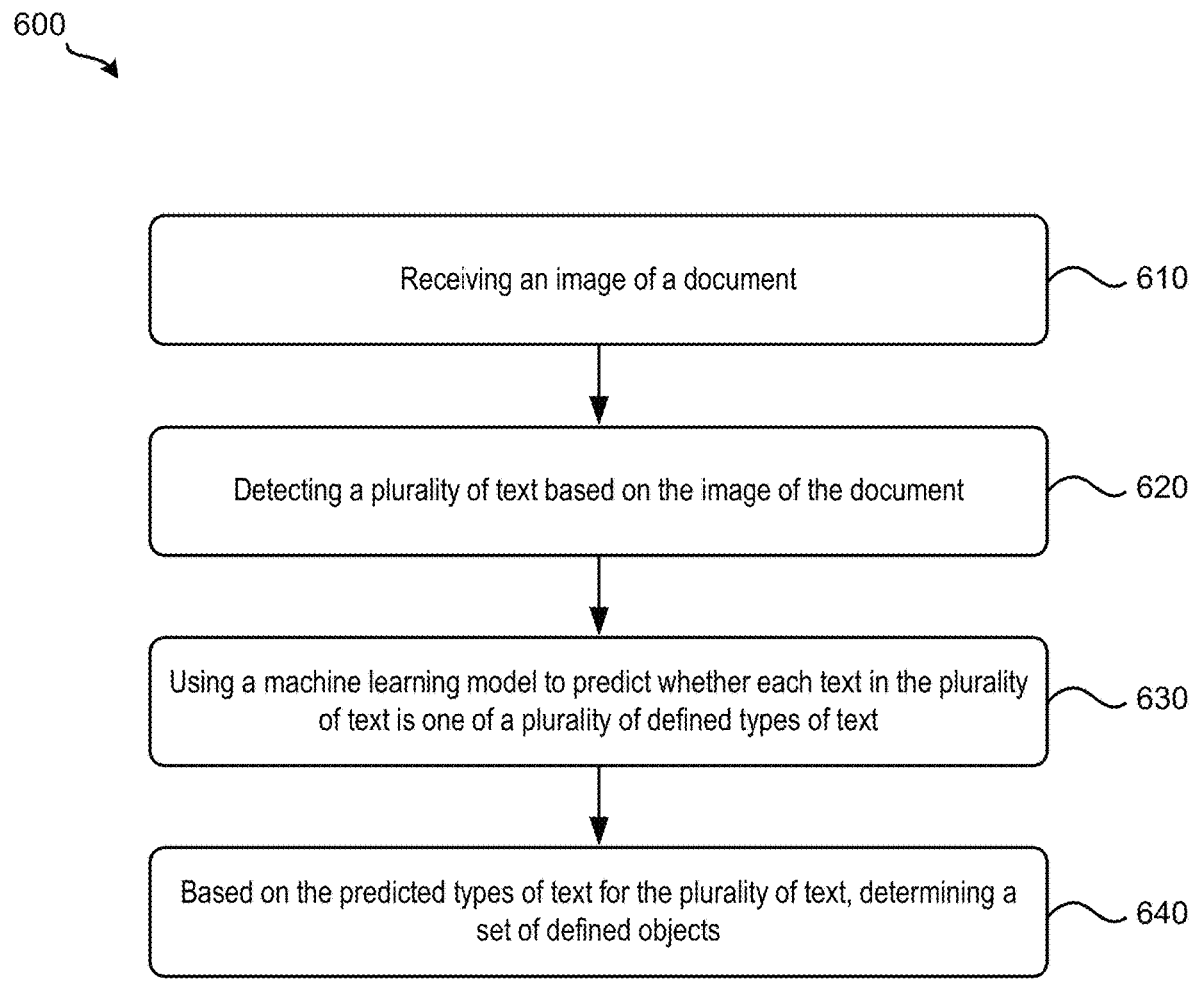
FIG. 6 illustrates a process for extracting defined objects from an image of a document according to some embodiments.

FIG. 6 illustrates a process 600 for configuring a time processing service according to some embodiments. In some embodiments, computing system 110 performs process 600. Process 600 begins by receiving, at 610, an image of a document. Referring to FIGS. 1 and 2A as an example, application 115 can receive image 400 of a receipt from client device 105.

Next, process 600 detects, at 620, a plurality of text based on the image of the document. Referring to FIGS. 1 and 2B as an example, text detector 120 may detect words in image 200. In addition, text detector 120 can determine bounding boxes for each of the detected words, as depicted in FIG. 2B. Process 600 then, uses, at 630, a machine learning model to predict whether each text in the plurality of text is one of a plurality of defined types of text. Referring to FIGS. 1 and 2B as an example, text type manager 125 may accesses ML models storage 140 to retrieve an ML model configured to predict date type of words, description type of words, and amount type of words based on words detected in images. Text type manager 125 can provide image 200 of the receipt, the words detected in image 200 of the receipt, and the bounding boxes of the detected words as inputs to the ML model. Based on the inputs, the ML model determines, for each detected word, whether the word is a date type of word, a description type of word, or an amount type of word and assigns a corresponding label to the word.

Finally, process 600 determines, at 640, a set of defined objects based on the predicted types of text for the plurality of text. Referring to FIGS. 1 and 3 as an example, object engine 130 may determine data objects 300 based on the predicted types of words in image 200 using the techniques described above.

Figure 7:
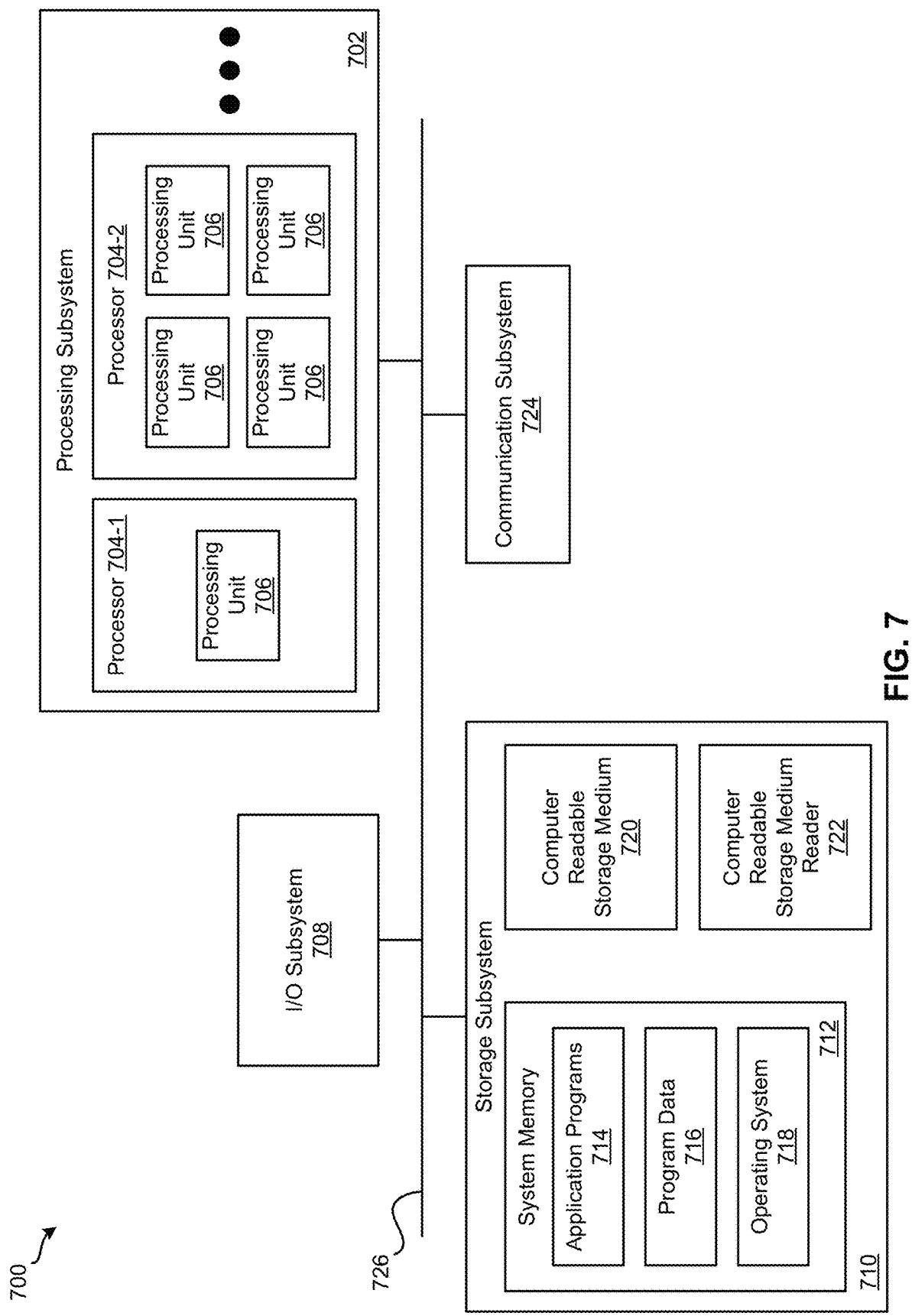
FIG. 7 illustrates an exemplary computer system, in which various embodiments may be implemented.

FIG. 7 illustrates an exemplary computer system 700 for implementing various embodiments described above. For example, computer system 700 may be used to implement client device 105 and computing system 110. Computer system 700 may be a desktop computer, a laptop, a server computer, or any other type of computer system or combination thereof. Some or all elements of application 115, text detector 120, text type manager 125, object engine 130, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 115), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 115, text detector 120, text type manager 125, and object engine 130) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
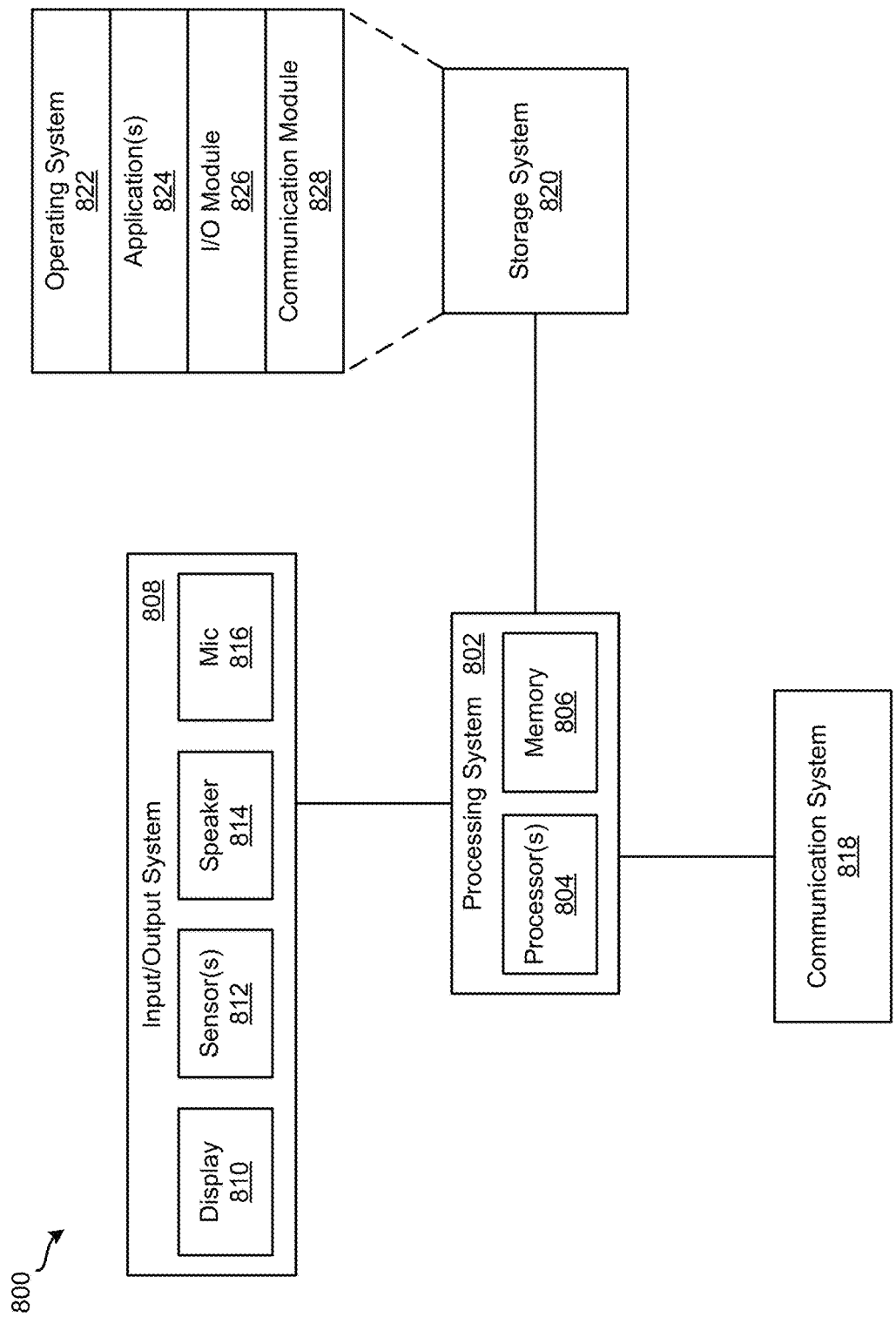
FIG. 8 illustrates an exemplary computing device, in which various embodiments may be implemented.

FIG. 8 illustrates an exemplary computing device 800 for implementing various embodiments described above. For example, computing device 800 may be used to implement devices client device 105. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
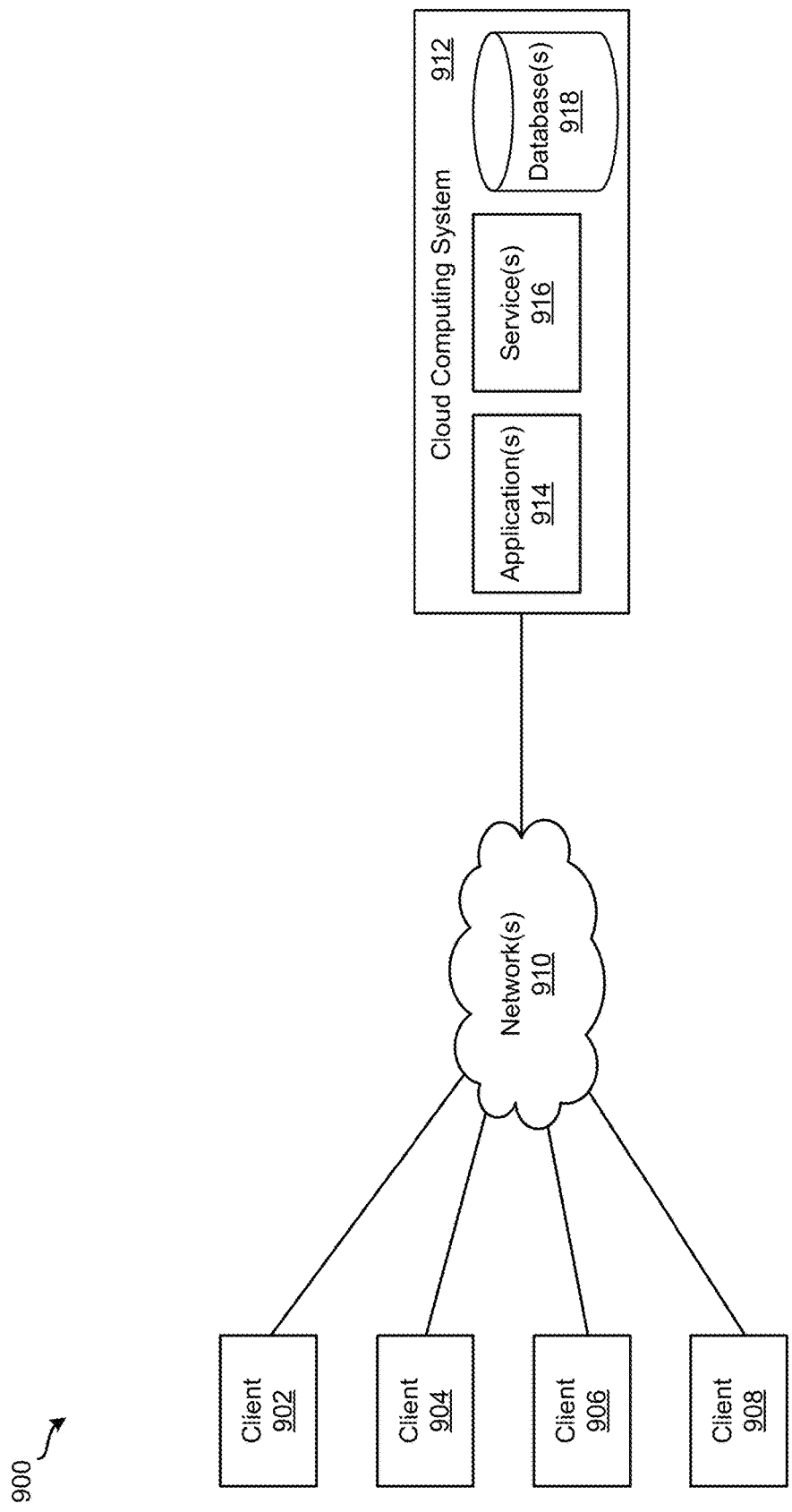
FIG. 9 illustrates an exemplary system, in which various embodiments may be implemented.

FIG. 9 illustrates an exemplary system 900 for implementing various embodiments described above. For example, cloud computing system 912 may be used to implement computing system 110 and one of the client devices 902-908 may be used to implement client device 105. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 135-150 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving an image of a document;
   detecting a plurality of text based on the image of the document;
   determining whether each text from the plurality of text is one of a plurality of defined text types;
   for each defined text type found in the plurality of text, calculating a number of text from the plurality of text having the defined text type;
   determining that the number of text is the same for each defined text type found in the plurality of text; and
   generating a set of defined objects such that each defined object in the set of defined objects includes text corresponding to each defined text type found in the plurality of text; and
   presenting at least one of the set of defined objects in a Graphical User Interface of a display.

2. The non-transitory machine-readable medium of claim 1, wherein the program further comprises sets of instructions for:
   determining a bounding box for each text in the plurality of text; and
   determining a particular bounding box that encompasses text from the plurality of text having one of the plurality of defined text types, wherein the set of defined objects are generated from text having a bounding box that is inside-the particular bounding box.

3. The non-transitory machine-readable medium of claim 2, wherein generating the set of defined objects comprises:
   sorting the plurality of text located inside the particular bounding box based on a y-coordinate of the bounding boxes of the plurality of text; and
   generating the set of defined objects based on the sorted plurality of text.

4. The non-transitory machine-readable medium of claim 1, wherein generating the set of defined objects comprises:
   determining, for each defined text type found in the plurality of text, a bounding box that encompasses text from the plurality of text having the defined type of text; and
   for each bounding box, identifying text in the bounding box that is predicted as not being the defined type of text and determining whether the identified text is the defined text type.

5. The non-transitory machine-readable medium of claim 1, wherein each defined object in the set of defined objects includes one of each defined text type found in the plurality of text.

6. The non-transitory machine-readable medium of claim 1, wherein the plurality of defined text types comprises a date type, a description type, and an amount type.

7. A method comprising:
   receiving an image of a document;
   detecting a plurality of text based on the image of the document;
   determining whether each text from the plurality of text is one of a plurality of defined text types;
   for each defined text type found in the plurality of text, calculating a number of text from the plurality of text having the defined text type;
   determining that the number of text is the same for each defined text type found in the plurality of text; and
   generating a set of defined objects such that each defined object in the set of defined objects includes text corresponding to each defined text type found in the plurality of text; and
   presenting at least one of the set of defined objects in a Graphical User Interface of a display.

8. The method of claim 7 further comprising:
   determining a bounding box for each text in the plurality of text; and
   determining a particular bounding box that encompasses text from the plurality of text having one of the plurality of defined text types, wherein the set of defined objects are generated from text having a bounding box that is inside-the particular bounding box.

9. The method of claim 8, wherein generating the set of defined objects comprises:
   sorting the plurality of text located inside the particular bounding box based on a y-coordinate of the bounding boxes of the plurality of text; and
   generating the set of defined objects based on the sorted plurality of text.

10. The method of claim 7, wherein generating the set of defined objects comprises:

determining, for each defined text type found in the plurality of text, a bounding box that encompasses text from the plurality of text having the defined type of text; and for each bounding box, identifying text in the bounding box that is predicted as not being the defined type of text and determining whether the identified text is the defined text type.

11. The method of claim 7, wherein each defined object in the set of defined objects includes one of each defined text type found in the plurality of text.

12. The method of claim 7, wherein the plurality of defined text types comprises a date type, a description type, and an amount type.

13. A system comprising:
a set of processing units; and
a non-transitory machine-readable medium storing instructions that when executed by at least one processing unit in the set of processing units cause the at least one processing unit to:
receive an image of a document;
detect a plurality of text based on the image of the document;
determine whether each text from the plurality of text is one of a plurality of defined text types;
for each defined text type found in the plurality of text, calculating a number of text from the plurality of text having the defined text type;
determine that the number of text is the same for each defined text type found in the plurality of text; and
generate a set of defined objects such that each defined object in the set of defined objects includes text corresponding to each defined text type found in the plurality of text; and
present at least one of the set of defined objects in a Graphical User Interface of a display.

14. The system of claim 13, wherein the instructions further cause the at least one processing unit to:
determining a bounding box for each text in the plurality of text; and
determining a particular bounding box that encompasses text from the plurality of text having one of the plurality of defined text types, wherein the set of defined objects are generated from text having a bounding box that is inside the particular bounding box.

15. The system of claim 14, wherein generating the set of defined objects comprises:
sorting the plurality of text located inside the particular bounding box based on a y-coordinate of the bounding boxes of the plurality of text; and
generating the set of defined objects based on the sorted plurality of text.

16. The system of claim 13, wherein generating the set of defined objects comprises:
determining, for each defined text type found in the plurality of text, a bounding box that encompasses text from the plurality of text having the defined type of text; and
for each bounding box, identifying text in the bounding box that is predicted as not being the defined type of text and determining whether the identified text is the defined text type.

17. The system of claim 13, wherein each defined object in the set of defined objects includes one of each defined text type found in the plurality of text.

* * * * *